United States Patent [19]
Klingler

[11] 3,728,346
[45] Apr. 17, 1973

[54] HYDROXYPHENYLHYDROXYALKYLAMINOALKYLTHEOPHYLLINES

[75] Inventor: Karl Heinz Klingler, Langen, Germany

[73] Assignee: Deutsche Gold-und Silber-Scheideanstaet vormals Roessler, Frankfurt am Main, Germany

[22] Filed: July 16, 1971

[21] Appl. No.: 163,468

[52] U.S. Cl. .............260/256, 260/253, 260/570.6, 424/253
[51] Int. Cl. .....................C07d 57/48, C07d 57/52
[58] Field of Search..............................260/253, 256

[56] References Cited

FOREIGN PATENTS OR APPLICATIONS 675,042  1/1966  Belgium ...........................260/253

*Primary Examiner*—Alex Mazel
*Assistant Examiner*—Anne Marie T. Tighe
*Attorney*—Cushman, Darby & Cushman

[57] ABSTRACT

Compounds are prepared having the formula

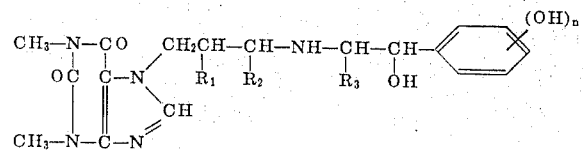

Where $R_1$ and $R_2$ are alkyl of one to four carbon atoms or one of them is hydrogen, $R_3$ is hydrogen or alkyl of one to two and $n$ is 1 or 2 or a salt thereof. The compounds have outstanding broncholytic activity.

10 Claims, No Drawings

HYDROXYPHENYLHYDROXYALKYLAMINOALKYLTHEOPHYLLINES

The present invention relates to novel basic substituted alkyltheophyllines containing branched alkyl groups.

In the Belgian Pat. No. 675,042 there are described compounds of Formula I.

$$T-CH_2CH_2CH_2-NH-CH_2CH-R'$$
$$|$$
$$OH \quad\quad I$$

where T is the theophyllinyl -(7)- group and R' is a hydroxaryl groups are important. These compounds have both a heart circulatory activity as well as a broncholytic activity.

The present invention is directed to new theophylline derivatives of the general Formula II.

$$\begin{array}{c}CH_3-N-CO \quad CH_2CHCH-NH-CHCH-\underset{}{\overset{(OH)_n}{\bigcirc}}\\ |\quad\quad |\quad\quad |\quad |\quad\quad |\quad |\\ OC\quad C-N\quad R_1\ R_2\quad R_3\ OH\\ ||\quad ||\quad \diagdown\\ \quad\quad CH\\ CH_3-N-C-N\diagup\end{array} \quad II$$

where $R_1$ and $R_2$ are the same or different and are lower alkyl of one to four carbon atoms and $n$ is 1 or 2, the optically active and diasteromer forms thereof as well as their salts, particularly the non toxic pharmacologically acceptable salts.

The theophylline derivatives of the invention have an outstandingly strong broncholytic activity.

In the known compounds of the Belgium patent the broncholytic activity is very strongly coupled with a disturbing side action. Especially there is observed an impressed and very dangerous tachycardia. These side reactions are frequently noticed even prior to the commencement of the desired broncholytic activity. The previously known compounds therefore are very difficult to handle in practice and are usable only in very special illnesses.

On the contrary it has been found surprisingly that the compounds of the invention in comparison to the known compounds have the following advantages. 1. The broncholytic activity is increased considerably and 2. The side reactions, especially tachycardia, either in general are not present in the range of effective dosage or only in such a slight amount that no impairment and disturbance of the healing activity occur.

The compounds of the invention in contrast to the known compounds are well tolerated by the organism, especially for the heart and circulation and possess a very large therapeutic latitude. They produce therefore a generally useful broncholytica.

Especially favorable properties are possed by compounds which have a mono hydroxy group on the phenyl nucleus in the 3- or 4- position or two hydroxy groups in the 3,5- positions. Also preferred are compounds in which $R_1$ is hydrogen, $R_3$ is hydrogen or alkyl, for example methyl, and $R_2$ is an alkyl group, for example methyl, and $R_2$ is an alkyl group, for example methyl, or compounds in which $R_1$ is an alkyl group, for example methyl, $R_2$ is hydrogen and $R_3$ is hydrogen or an alkyl group, for example methyl.

For the salts of the amines of Formula II there can be prepared and employed salts of any non toxic pharmaceutically acceptable acid such as hydrochloric acid, hydrobromic acid, sulfuric acid, p-toluene sulfonic acid, acetic acid, propionic acid, succinic acid, maleic acid, malonic acid, fumaric acid, lactic acid, tartaric acid, citric acid.

Examples of compounds within the present invention in addition to those mentioned in thespecific examples include 7-[3-(2-p-hydroxyphenyl-2-hydroxyethylamino)-amyl-(1)]-theophylline (and its salts, e.g. hydrochloride, and acetate salts); 7-[2-propyl -3[2-(3,5-dihydroxyphenyl)-2-hydroxyethylamino]-propyl-(1)]-theophylline; 7-[2,3 -dimethyl-3-(methyl-2-p-hydroxyphenyl-2-hydroxyethylamino)- propyl-(1)]-theophylline hydrochloride; 7-[3-[2-(3,5-dihydroxyphenyl)-2-hydroxy-ethylamino]-heptyl-(1)]-theophylline; 7-[2 -methyl-3-(1-butyl-2-(3,4-dihydroxyphenyl)-2-hydroxyethylamino)-propyl-(1)]-theophylline; 7-[2-butyl-3-[2-(3,5-dihydroxy-phenyl)-2-hydroxyethylamino]-butyl-(1)]-theophylline hydrochloride.

The compounds of the invention can be prepared in various ways which as of themselves are generally known.

a. By reducing the keto group of compounds of the formula $$\begin{array}{c}CH_3-N-CO \quad\quad\quad\quad\quad\quad\quad\quad (OH)_n\\ |\quad\quad |\quad\quad\quad\quad\quad\quad\quad\quad\quad\quad\quad\quad\\ OC\quad C-N-CH_2CHCH_2-NH-CH-C-\underset{}{\overset{}{\bigcirc}}\\ ||\quad ||\quad \diagdown\quad\quad |\quad |\quad\quad |\quad ||\\ \quad\quad CH\quad R_1\ R_2\quad R_3\ O\\ CH_3-N-C-N\diagup\end{array} \quad III$$

or their salts to the hydroxyl group or b. By reacting in a solvent a compound of the general formula $$\begin{array}{c}CH_3-N-CO\\ |\quad\quad |\\ OC\quad C-N-CH_2CHCH-Z\\ ||\quad ||\quad \diagdown\quad\quad |\quad |\\ \quad\quad CH\quad R_1\ R_2\\ CH_3-N-C-N\diagup\end{array} \quad IV$$

with a compound of the general formula $$X-CHCH(OH)-\underset{}{\overset{(OH)_n}{\bigcirc}}$$
$$|$$
$$R_3 \quad\quad V$$

wherein one of X and Z is a halogen and the other is an amino group, or c. By reacting theophylline or a metal salt thereof with a compound of the general formula $$Hal-CH_2CHCH-NH-CHCH(OH)-\underset{}{\overset{(OH)_n}{\bigcirc}}$$
$$|\quad |\quad\quad |$$
$$R_1\ R_2\quad R_3 \quad\quad VI$$

in a given case in the presence of an alkaline condensation reagent, e.g. sodium hydroxide or potassium hydroxide, or d. By condensing with hydrogenation a compound of the general formula $$\begin{array}{c}CH_3-N-CO \quad CH_2-CH-V\\ |\quad\quad |\quad\quad\quad\quad\quad\quad |\\ OC\quad C-N\quad\quad\quad\quad R_1\\ ||\quad ||\quad \diagdown\\ \quad\quad CH\\ CH_3-N-C-N\diagup\end{array} \quad VII$$

with a compound of the general formula

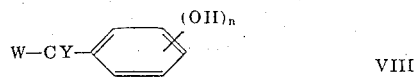

Where One Of V and W is $-C(R')=O$ and the other is $-C(R')-NH_2$ and where R' independent of V or W is hydrogen or an alkyl group with one to four carbon atoms and Y is either an oxygen atom or a hydroxyl group + a hydrogen atom, or e. by reacting a compound of general formula IV where Z is an amino group or a protected amino group with a compound of the general formula

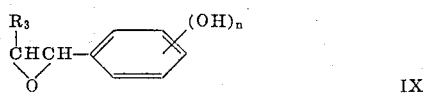

In the above recited processes it is frequently expedient to protect the phenolic hydroxyl groups as well as the secondary or primary amino groups by a known protective group. Frequently such protective groups are already required for the starting compounds. These protective groups are easily splittable from the end products. It is either a matter of easily solvolytic splittable acyl groups or hydrogenating splittable groups. The solvolytic splittable protective groups are split off for example by saponification with dilute acids at room temperature or by a short boiling. According to the type of protective group, however, the splitting also takes place during the reaction process. For example the latter is the case in process (a) if the secondary amino group as well as, in a given case, the phenolic hydroxyl group also are protected by a benzyl group or a carbobenzoxy group. If the protective group is not split off during the reaction a simple after treatment of the reaction product is necessary wherein then the splitting off of the protective groups takes place, for example under the conditions given above.

As protective groups for the secondary amino groups (processes (a) and (c)) as well as for the primary amino groups (processes (b), (d) and (e); these amino groups can naturally only at times carry a protective group) there can be used, for example: the benzyl group, α-phenylethyl gropu, benzyl groups substituted in the benzene nucleus such as for example the p-bro- or p-nitrobenzyl group, the carbobenzoxy group, the trifluoroacetyl group, the phthalyl group, the trityl group, the p-toluenesulfonyl group and similar groups. These same protective groups can be used for the phenolic hydroxyl groups; additionally there can be used simple acyl groups as, for example, the acetyl group.

In process (a) in general there is already present this type of protective group from the production of the starting material. This protective group (benzyl group) is then in the hydrogenation hydrogenated off simultaneously with the reduction of the keto groups. If the reduction is carried out in another manner, in a given case a hydrogenation with hydrogen is joined thereto.

The reduction of the keto group according to process (a) is generally carried out by catalytic hydrogenation. As catalysts there can be used, for example, the customary finely divided metal catalysts such as noble metal catalysts, for example platinum or especially palladium. The process can be carried out at normal or elevated temperatures. A temperature range of about 40° to 100°C. is suitable. If the phenolic hydroxyl groups as well as the secondary amino groups contain benzyl protective groups then these aree split off simultaneously in the catalytic hydrogenation, if for example a palladium catalyst is used.

The reduction of the keto group can also be accomplished in other ways, for example by lithium aluminum hydride or sodium borohydride.

Process (b) is carried out suitably in a solvent such as benzene, toluene, xylene, dimethyl formanide, ethanol or butyl alcohol at temperatures between 50° and 200°C. It is recommended to work in the presence of an acid acceptor, for example potassium carbonate, sodium carbonate, etc. An excessive of the amine can also serve as an acid acceptor.

In process (d) the reaction partners are reacted with each other at normal or elevated pressure, at room temperature or at elevated temperature. The preferred temperature range is between 40° and 100°C. The process can be carried out in solution or supension using the customary solvents or solvent mixtures. As catalysts there can be used the customary hydrogenation catalysts. If benzyl groups are to be removed simultaneously with the hydrogenation preferably there are used palladium catalysts.

Process (e) can be carried out with or without solvents. Temperatures within the range of 0° to 100°C. are preferred. In this process it is especially recommended to use materials within Formula IX in which the OH groups are protected.

The production of the starting materials for process (a) can, for example, take place in a manner analogans to the process described in Belgian Pat. No.. 675,042. The entire disclosure of the Belgian patent is hereby incorporated by reference.

The starting compounds of formula V which are employed in process (b) can be obtained for example from the corresponding 1-oxo-1-hydroxyphenyl-2-haloalkanes preferably having protected hydroxy groups by reduction of the keto group with sodium borohydride.

The starting compounds of Formula VI (process c) can for example be obtained in the following manner. A compound of general formula X

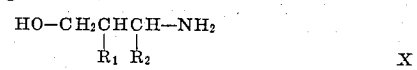

is reacted in customary manner in a solvent at elevated temperature with a compound of general formula V where X is a halogen and the phenolic hydroxyl groups in a given case are protected. The reaction product in the form of an acid addition salt is subsequently halogenated with a halogenation agent, for example $SOCl_2$.

The starting compounds of formula IX (process (e)) can be produced in customary manner from halohydrins of formula V, where X is a halogen (for this procedure attention is called to Houben/Weyl Vol. 6/3 pages 374 et seq.). The process comprises treatment of the halohydrin with an alkaline agent, for example alcoholic KOH at low temperatures. The phenolic hydroxyl groups are preferably protected and in a given case the protective groups subsequently removed.

In the case of process (a) in which the starting materials of formula III is produced by reaction of aminoalkyltheophyllines with the corresponding α- bromoalkyl hydroxyphenylketones, this process can also be carried out as a one step process without previous isolation of the keto compound of formula III (see example 6 below).

The compounds can be converted into salts in the conventional manner. As anions for the salts there can be used the known, therapeutically useful acid groups. Typical suitable acids for forming the salts have been set forth above.

Those compounds which contain asymmetric carbon atoms and which as a rule are obtained as racemates can be split into optically active isomers in known manner, for example by means of an optically active acid. However, it is also possible from the outset to employ optically active or diastereometric starting materials whereby there is obtained as the final product a corresponding pure optically active form or a diastereomer configuration. There can also occur stereoisomer racemates since there are present in the compounds produced two or more asymmetrical carbon atoms. Separation is possible in the customary manner, for example by recrystallization.

As stated previously the compounds of the invention are useful in the production of pharmaceutical compositions. The pharmaceutical compositions or medicaments can contain one or more of the compounds of the invention or mixtures of these with other pharmaceutically active materials. For the production of pharmaceutical preparations there can be used the customary pharmaceutical carriers and assistants. The medicines can be used internally, parenterally, orally or perlingually or in the form of sprays. Dispensing can take place in the form of tablets, capsules, pills, dragees, plugs, salves, powders, liquids or aerosols. As liquids there can be used oily or aqueous solutions or suspensions, emulsions, injectable aqueous or oily solutions or suspensions.

Unless otherwise indicated all parts and percentages are by weight.

In the following examples the theophyllinyl-(7)-group with the chemical structure $$\begin{array}{c} CH_3-N-CO \\ | \quad \quad \quad \backslash \\ OC \quad C-N \\ | \quad \quad \quad \quad \backslash CH \\ CH_3-N-C-N \nearrow \end{array}$$

is designated by the symbol

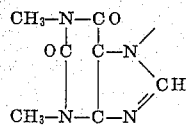

EXAMPLE 1

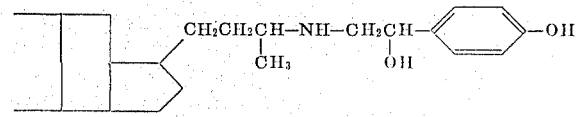

14 grams of 7-[3-(2-p-benzyl-hydroxyphenyl-2-oxoethyl-benzylamino)-butyl-(1)]-theophylline hydrochloride were hydrogenated at 60°C. in 200 ml. of dimethyl formanide with addition of 1.4 grams of palladium — activated carbon (5 percent Pd). after the hydrogen absorption stopped) the product was filtered and the solvent distilled off from the filtrate. The residue, after removal of solvent was taken up in ethyl alcohol. There was added absolute ether until turbidity remained and the material which crystalized out was filtered with suction after about 2 days. After recrystallization from methyl alcohol with the addition of acetone there were obtained 5,3 grams of 7-[3-(2-p-hydroxyphenyl-2-hydroxyethylamino)-butyl-(1)]-theophylline hydrochloride, M.P. 200°-201°C.

The starting material was produced as follows. 37 grams of 7-3-benzylamino-butyl)-theophylline and 16.5 grams of p-benzyl-hydroxy-ω-bromoacetophenone were heated at reflux in 165 ml. of toluene for 7 hours with stirring. After cooling the mixture was filtered with suction and the filtrate evaporated in a vacuum. The residue was taken up in ethyl alcohol and acidified with alcoholic hydrochloric acid. On the next day the 7-[3-(2-p-benzylhydroxyphenyl-2-oxo-ethyl-benzylamino)-butyl-(1)]-theophylline hydrochloride which crystallized out was filtered with suction and recrystallized from methyl alcohol. There were obtained 15.1 grams of the pure material M.P. 215°-219°C.

EXAMPLE 2

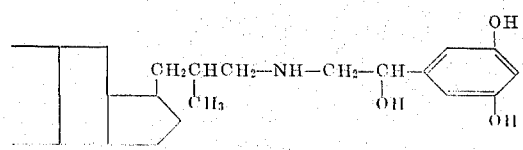

4.5 grams of 7-[2-methyl-3-[2-(3,5-dihydroxyphenyl)-2-oxoethyl-benzyl-amino]-propyl-(1)]-theophylline suspended in 70 ml. of dimethyl formamide were hydrogenated at 80°C. by addition of 0.3 grams of 5 percent palladium on activated carbon as a catalyst. The reaction solution was filtered and the filtrate evaporated in a vacuum. The residue was recrystallized from ethyl alcohol. There were obtained 2.4 grams of 7-[2-methyl- 3-[2-(3,5-dihydroxyphenyl)-2-hydroxyethylamino]-propyl-(1)]-theophylline hydrochloride, M.P. 216°-218°C.

The starting material was produced as follows. 22.5 grams of 7-(2-methyl-3-benzylaminopropyl) theophylline were refluxed in 150 ml. of benzene with 10.4 grams of 3.5-diacetoxy-ω-bromoacetophyenone with stirring. After 4 hours the mixture was cooled, the unreacted starting material filtered off with suction (it was present as the HBr salt) and the filtrate evaporated in a vacuum. The residue was dissolved in a little ethyl alcohol and treated with alcoholic hydrochloric acid until a PH of 3-4 was reached. The material crystallized out in the refrigerator and was filtered off with suction after about 3 days.

Finally the intermediate product thus obtained was refluxed with 10 ml. of 10 percent hydrochloric acid and 15 ml. of methanol for 30 minutes with stirring. Then it was distilled in vacuum, the residue taken up in a little ethyl alcohol and treated with absolute ether. There crystallized out 4.5 grams of 7-[2-methyl-3[2-(3,5-dihydroxyphenyl)-2-oxo-ethyl-benzylamino] - propyl-(1)]-theophylline hydrochloride, M.P. 237°-239°C.

EXAMPLE 3

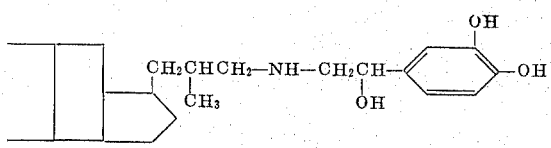

18.4 grams of 7-[2-methyl-3-[2-(3,4-dihydroxyphenyl)- 2-oxoethyl-benzyl-amino]-propyl-(1)]-theophylline hydrochloride in a mixture of 300 ml. of distilled water and 120 ml. of methanol were hydrogenated at 60°C. with addition of 1.8 grams of 5 percent palladium an activated carbon. After about 6 hours the absorption of hydrogen ceased. The product was filtered evaporated in a vacuum and the residue boiled with ethyl alcohol. After cooling the product was filtered with suction and dried. There were obtained 9.6 grams of 7-[2-methyl- 3-[2-(3,4-dihydroxyphenyl)-2-hydroxyethylamino]-propyl-( 1)]-theophylline hydrochloride, M.P. 197°–198°C.

The starting material was obtained as follows. 45 grams of 7-(2-methyl-3-benzylaminopropyl)-theophylline were heated at reflux in 140 ml. of 25 percent ethyl alcohol with stirring. Inside 2.5 hours there were added doopwise 12.2 grams of ω-chloroacetyl pyrocatechol in 73 ml. of ethanol. Finally the mixture was boiled three hours longer, evaporated in a vacuum and the residue recrystallized from aqueous methanol by addition of acetone. There were obtained 18.7 grams of 7-[2-methyl-3-[2-(3,4-dihydroxyphenyl)-2-oxoethyl-benzylamino] -propyl-(1)]-theophylline hydrochloride, M.P. 227°–229°C. From the mother liquor there was recovered excess 7-(2-methyl-3-benzyl-aminopropyl)-theophylline.

EXAMPLE 4

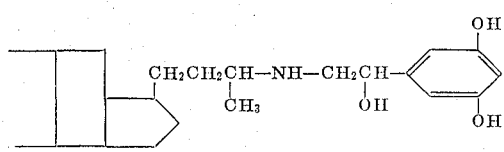

10.9 grams of 7-[3-[2-(3,5-dihydroxyphenyl)-2 -oxoethylbenzyl-amino]-butyl-(1)]-theophylline hydrochloride were hydrogenated at 58°C. with addition of palladium-activated carbon in a manner analogous to example 1. There were obtained 6.8 grams of 7-[3-[2-(3,5-dihydroxyphenyl)- 2-hydroxyethylamino]-butyl-(1)]-theophylline hydrochloride, M.P. 197°–220°C. (a mixture of the diastereomers). By recrystallization from aqueous ethanol there was obtained one of the two possible stereoisomers, M.P. 218°–220°C. This compound is identified herein as D 4908.

The starting compound was obtained as follows. 34.1 grams of 7-(3-benzylaminobutyl)-theophylline were dissolved in 93 ml. of butanol with the addition of 9.3 grams of 3,5 -dihydroxy-ω-chloroacetophenone. The mixture was heated to boiling inside of half an hour in a nitrogen atmosphere and heated further for 3 hours at reflux. On the next day the mixture was filtered with suction, washed with butanol and the filtrate after dilution with ethyl alcohol acidified with alcoholic hydrochloric acid. The crude product was filtered off with suction after 24 hours and recrystallized from methanol. There are obtained 10.9 grams of 7-[3-[2-(3,5-dihydroxyphenyl)- 2-oxoethyl benzyl-amino]-butyl-(1)]-theophylline hydrochloride, M.P. 193°–196 °C.

EXAMPLE 5

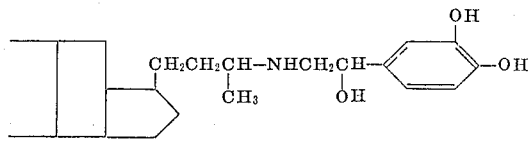

The above compound was obtained by hydrogenation of 7-[3-[2-(3,4-dihydroxyphenyl)-2-oxoethylbenzylamino]-butyl-( 1)]-theophylline hydrochloride in a manner analogous to Example 4. The hydrochloride melts at 168°–170°C.

The starting material was obtained from 30 grams of 7-(3-benzylaminobutyl)-theophylline and 8.1 grams of 3,4 -dihydroxy-ω-chloroacetophenone in a manner analogous to Example 4.

EXAMPLE 6

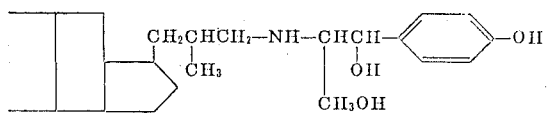

50 grams of 7-(2-methyl-3-benzyl-aminopropyl-theophylline were heated at reflux together with 23.5 grams of p-benzylhydroxy-α-bromopropio-phenone in 230 ml. of xylene with stirring. After 26 hours the mixture was cooled, the 7-(2-methyl-3-benzylaminopropyl)- theophylline hydrobromide formed removed with suction and the filtrate evaporated in a vacuum. The residue was dissolved in methanol and the solution obtained stirred for 1 hour with $Al_2O_3$. The product was filtered, evaporated, dissolved in 450 ml. of dimethyl formamide, 4.5 grams of 5 percent palladium on activated carbon added as a catalyst and hydrogenated at 60°C. After hydrogenation it was filtered, evaporated in a vacuum and recrystallized from ethyl alcohol. There were obtained 14.6 grams of 7-[2-methyl-3-[1-methyl-2-p-hydroxyphenyl-2-hydroxyethyl-amino] -propyl-(1)]-theophylline hydrochloride, M.P. 209°–211°C.

The starting material of formula V for process (b) can be prepared in the following manner:

11(3,4-dibenzylhydroxyphenyl)-1-hydroxy-2-bromoethane

Inside 1 hour there were added with stirring 4.51 grams of sodium borohydride to a suspension of 18.1 grams of 1-(3,4-dibenzylhydroxy-phenyl)-1-oxo-2-bromoethane in 275 ml. of methanol. The temperature was held at 5° to −6°C. The mixture was stirred for a further time of 1.5 hours at 0°C., treated with 10 percent acetic acid and poured into 1.5 liters of water. On the next day the mixture was filtered with suction and dried in a vacuum of 40°C. There were obtained 17.0 grams of bromohydrin, M.P. 66°–68°C.

EXAMPLE 7

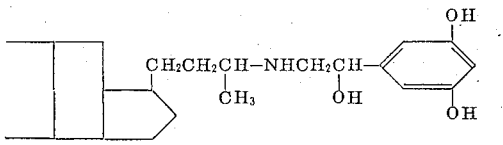

2.5 grams of 7-(3-oxobutyl)-theophylline(produced as described in Chem. Abst. Vol. 70 page 377 88j) and 3.5 grams of 1-(3,58c -dibenzylhydroxy-phenyl)-2-aminoethanol-(1) (produced as described in British Pat. No. 1,031,368) in 60 ml. of ethyl alcohol at 30°C. with the addition of 0.1 gram of platinum oxide were shaken with hydrogen. When one mole of hydrogen was taken up, the mixture was filtered, neutralized with alcoholic hydrochloric acid and further hydrogenated at 60°C. with addition of 0.5 grams of a 10 percent palladium an activated carbon catalyst. Thereby two further moles of hydrogen were consumed. The product was worked up by filtering, evaporating in a vacuum and recrystallizing the 7-[3-[2-(3,5-dihydroxyphenyl)-2-hydroxyethylamino]-butyl-(1)]-theophylline hydrochloride obtained from aequeous ethyl alcohol. The melting point was 220°–224°C. Yield 2.8 grams.

EXAMPLE 8

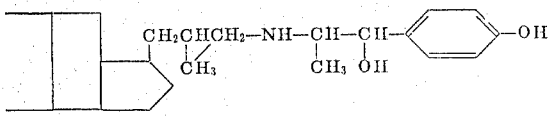

26.7 grams of 7-(2-methyl-3-amino-propyl)-theophylline were hydrogenatingly condensed at 65°C. with 16.6 grams of p-hydroxyphenyl acetyl carbinol in 200 ml. of ethyl alcohol with the addition of 1.5 grams of 5 percent palladium an activated carbon catalyst. After filtering, the mixture was acidified with alcoholic hydrochloric acid, evaporated in a vacuum and recrystallized from ethyl alcohol. There were obtained 11.3 grams of 7-[2-methyl-3-(1-methyl-2-p-hydroxyphenyl-2-hydroxyethylamino)-ppyl-(1)]-theophylline hydrochloride, M.P. 208°–210°C.

The 7-(2-methyl-3-aminopropyl)-theophylline starting material is known and can be produced for example from 7-(2-methyl-3-chloropropyl)-theophylline and excess ammonia in an autoclave at 120°C. The p-hydroxyphenyl acetyl carbinol is obtained from p-hydroxyphenyl ethinyl carbinol by the addition of water according to the process described in J.A.- C.S. Vol. 77, 3253 (1955).

The hydrochloride salts in Examples 1–8 can be converted to the free bases inn conventional manner, e.g. by neutralization of a methanol solution of the salt with sodium hydroxide, sodium carbonate and so on.

The compounds of the invention are suited for the production of pharmaceutical compositions and preparations as indicated above. The pharmaceutical compositions or medicines contain as the active ingredient one or more of the compounds of the invention, in a given case in admixture with other pharmacologically or pharmaceutically active materials. The production of the medicine can take place using known and customary pharmaceutical carriers.

Such carriers and assistants are for example in Ullmann's Encyclopadie der technischen Chemie, Vol. 4 (1953), pages 1 to 39; Journal of Pharmaceutical Sciences, Vol. 52 (1963), pages 918 et seq., H.V. Czetsch-Lindenwald, Hilfstoffe fur Pharmazie und angrenzende Gebiet as well as in Pharm. Ind. Vol. 2(1961) pages 72 et seq. Examples are gelatin, sucrose, glucose, fructose, maltose, lactose, starch, pectin, tylose, talc, lycopodium, silica, cellulose derivatives, micronized cellulose, stearates, emulsifiers, plant oils, water pharmaceutically compabible mono or polyvalent alcohols and polyglycols and derivatives thereof such as ethyl alcohol, glycerine, pentaeythritol, sorbitol, mannitol, diethylene glycol, ethylene glycol, propylene glycol and polyethylene glycol 400, dimethyl sulfoxide, esters of saturated and unsaturated aliphatic fatty acids with mono or polyvalent alcohols such as glycols, glycerine, diethylene glycol, pentaerythritol, sorbitol and mannitol, etc. which in a given case can also be etherified, e.g. glyceryl stearate, glyceryl palmitate glyceryl oleate, glyceryl linoleate, methoxyethyl stearate, benzyl benzoate, dioxolane, glycerine formal, glycol furol, dimethyl acetamide, lactamide, lactates, e.g. ethyl lactate, ethyl carbonate, etc.

Furthermore there can be added preservatives, buffers, flavor correctives, antioxidants and complex formers (for example, ethylene diamine tetraacetic acid) and the like.

As antioxidants there can be used for example sodium meta bisulfite and ascorbic acid, as preservatives, for example sorbic acid, p-hydroxybenzoic acid ethyl ester and the like.

The compounds of the invention show a good bronchospasmotylic activity on the basis of the method of H. Konzett and Rossler (Arch. exp. Path, Pharmakol., Vol. 195 page 71 (1940). While Konzett et al. employed guinea pigs in the work reported below there were employed dogs. The procedure was as follows: Mongrel dogs were anaesthetized with ether, decerebrated and demudullated and artificially respirated. After the preparation of the trachea this organ was intubated with a glass tube. The tube is divided into three branches at the end outside of the trachea. One branch was connected with a piston recorder whose level transmitted the data to the kymograph, the second branch was connected with the respiratory pump to blow the air into the lungs; the third one was connected with the pump for the transport of the expired air from the lungs. The intravenous injection of 20 mg/kg histamine dihydrochloride produces a bronchoconstriction. Consequently, the air coming from the respiration pump cannot enter the lungs and is, therefore, conducted to the piston recorder. The increase of the air pressure now provokes a rise of the lever and consequently a sharp increase of the curve at the kymograph. After a few seconds the effect of histamine is finished, the bronchoconstriction is abolished and a normal respiration occurs.

The intravenous injection of a bronchodilatory agent is able to inhibit the bronchospasm of histaminedihydrochloride. Therefore, the application of a bronchodilating compound produces no signs of a histamine induced bronchoconstriction in the lungs as well as on the curve at the kymograph.

The bronchodilating activity of a substance is tested in three to five dosages to find out a dose-depending relationship of the drug.

The bronchospasmolytic activity using the Konzett method described above is comparable to the known medicine Orciprenalin.

The lowest effective dosages are for example:
0.01 mg/kg orally
0.01 mg/kg sublingually
0.000013 mg/kg intravenously As a general dosages range for activity there can be used, for example:
0.05 -1.2 mg/kg orally
0.025-1.2 mg/kg sublingually
0.000050-0.001 mg/kg intravenously The compounds of the invention are indicated for the treatment of bronchial asthma, status asthmaticus, emphysema and chronic asthmatic bronchitis.

The pharmaceutical preparations generally contain between 1 and 50 percent of the active components or components of the invention, although they can contain up to 100 percent of the active component.

As indicated previously dispensing can be in the form of tablets, capsules, pills, dragees, plugs, salves, powders, liquid or alroals. As liquids there can be employ oily or aqueous solutions or suspensions, emulsions, injectable aqueous or oily solutions or suspensions, a preferred form of use is as tablets which contain between 5 and 40 mg, or solutions which between 0.005 and 2 percent of active material.

In individual dosages the amount of active component of the invention for example can be 20 mg. when administered orally or 0.1 mg. when administered intravenously, all calculations being based on the free base. These dosages can be dispensed one or more times a day.

For example there is recommended 2 to 4 times daily one tablet with a content of 20 mg. of active material or in intravenous injections 1 to 2 times a day or 2 ml. ampoule containing 0.1 mg. of active substance.

The acute toxicity of the compounds of the invention on the mouse (expressed by the LD 50 in mg/kg) for example in oral application is above 800C. mg./kg. or in dog of 500 mg/kg.

The following examples show pharmaceutical compositions using the compound D 4908 prepared in Example 4.

Example of producing a table containing:

| | |
|---|---|
| 20 mg D 4908.HCl | |
| D 4908.HCl (racemate) | 20.0 grams |
| sodium metabisulfite | 0.2 g. |
| ethylene diamine tetraacetic acid | 0.2 |
| Aerosil (flame hydrated silica gel) | 2.0 |
| Mannitol | 128.0 | were mixed. Granules were produced in known manner by adding about 50 grams of a granulating agent consisting of

| | |
|---|---|
| Methocel 60Hg (methyl cellulose) | 1.0 grams |
| Ethanol | 12.0 g. |
| Water | 37.0 g. | and the granules sieved to a particle size of about 0.5–1. The granulate was then mixed with 0.9 grams of magnesium stearate 4.0 grams of Avicel (micronized cellulose) and 145.5 g. of corn starch. From this mixture there were molded 1,000 tablets each of 170 mg. always with a content of 20 mg. of D 4908

Production of an Injectable Solution

| | |
|---|---|
| D4908. HCl (racemate) | 0.1 gram |
| Sodium meta bisulfite | 0.3 g. |
| Ethylene diamine tetraacetic acid-disodium salt | 0.3 g. |
| Sodium hydroxide (4%) | 3.6 ml |
| Acetic acid (6%) | 20.0 ml | were dilute to 1,000 ml with water for injectable purpose.

The assistants were dissolved inn water for injection; the solutions saturated with nitrogen and filtered through a germicidal filter. The active material was dissolved in about 100 ml of the sterile filtrate. The active salt solution was filtered through a glass frit (size G4) and combined with the main amount of the sterile filtrate. The ampoules were filled under nitrogen and sterilized for 30 minutes at 1,000 C. The ampoules contained 0.5 mg of D4908.

The compounds can be administered to mammals including humans, dogs, cats, sheep, cattle, mice, rats, etc.

EXAMPLE 9

50,0 grams of D 4908·HCl (produced as described in Example 4) were dissolved in 1,000 ml. of destilled water. To this solution 40 ml of 10 percent ammonia solution were added in a nitrogen atmosphere. On the next day the 7-[3-[2-(3,5-dihydroxyphenyl)-2-hydroxyethylamino]-butyl-(1)]-theophylline was filtered with suction, washed with water and recrystallized from acetone. There were obtained 38 grams of D 4908-base, M.P. 203°–206°C.

What is claimed is:

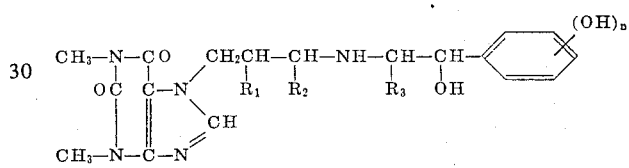

wherein one of $R_1$ and $R_2$ is alkyl of one to four carbon atoms and the other of $R_1$ and $R_2$ is alkyl of one to four carbon atoms or hydrogen, $R_3$ is hydrogen or alkyl of one to four carbon atoms and $n$ is 1 or 2 or a pharmacologically acceptable salt thereof.

2. A compound according to claim 1 wherein all alkyl groups are methyl groups.

3. A compound according to claim 1 wherein $n$ is 2 and the hydroxyl groups are in the 3.5 or 3,4 positions on the phenyl group.

4. A compound according to claim 3 wherein $R_1$ and $R_3$ are hydrogen.

5. A compound according to claim 4 wherein $R_2$ is methyl.

6. A compound according to claim 3 wherein $R_2$ and $R_3$ are hydrogen.

7. A compound according to claim 6 wherein $R_1$ is methyl.

8. A compound according to claim 1 where $n$ is 1 and the hydroxyl group is in the 3, or 4 position on the phenyl group.

9. A compound according to claim 8 wherein $R_1$ and $R_3$ are hydrogen and $R_2$ is methyl.

10. A compound according to claim 8 wherein $R_2$ and $R_3$ are hydrogen and $R_1$ is methyl.

* * * * *